United States Patent
Kameyama

(10) Patent No.: US 7,158,266 B2
(45) Date of Patent: Jan. 2, 2007

(54) INFORMATION PROCESSING SYSTEM, INFORMATION PROCESSING APPARATUS, IMAGE PICKUP SYSTEM, INFORMATION PROCESSING METHOD, AND PROGRAM

(75) Inventor: Takaki Kameyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1056 days.

(21) Appl. No.: 09/841,066

(22) Filed: Apr. 25, 2001

(65) Prior Publication Data
US 2001/0043366 A1 Nov. 22, 2001

(30) Foreign Application Priority Data
May 16, 2000 (JP) .............................. 2000-143207

(51) Int. Cl.
G06K 15/00 (2006.01)
G06F 15/00 (2006.01)
(52) U.S. Cl. ...................... 358/403; 358/1.15; 358/302
(58) Field of Classification Search ............... 358/1.15, 358/1.9, 1.16, 1.17, 1.18, 403, 302; 348/231.1, 348/231.2, 231.9; 707/104.1
See application file for complete search history.

(56) References Cited

U.S. PATENT DOCUMENTS

| | | | |
|---|---|---|---|
| 5,848,420 A * | 12/1998 | Xu | 707/104.1 |
| 5,861,918 A * | 1/1999 | Anderson et al. | 348/231.9 |
| 6,396,518 B1 * | 5/2002 | Dow et al. | 715/772 |
| 6,668,134 B1 * | 12/2003 | Niikawa | 386/95 |
| 6,812,961 B1 * | 11/2004 | Parulski et al. | 348/231.2 |

* cited by examiner

Primary Examiner—Gabriel I. Garcia
(74) Attorney, Agent, or Firm—Fitzpatrick, Cella, Harper & Scinto

(57) ABSTRACT

In order that, even if a large amount of photographed images are present within an image pickup apparatus, processing of determining the degree of progress of transfer can be promptly performed with a slight burden, and a display of the degree of progress is not displayed, i.e., a display of progress of transfer can be promptly performed after an instruction to start transfer, a signal indicating the status of progress of transfer of data files is output based on the number of transmission directories acquired by a transmission-directory acquisition unit and the number of transmitted directories acquired by a transmitted-directory acquisition unit.

49 Claims, 5 Drawing Sheets

INFORMATION PROCESSING SYSTEM, INFORMATION PROCESSING APPARATUS, IMAGE PICKUP SYSTEM, INFORMATION PROCESSING METHOD, AND PROGRAM

BACKGROUND OF THE INVENTION

1. Field of the Invention

The present invention relates to transmission/reception of data between information processing apparatuses, and transmission/reception of image data photographed by an image pickup apparatus.

2. Description of the Related Art

An image photographed by an image pickup apparatus is usually utilized by being transferred to and stored in a computer. This is because a flash memory card mainly used as a storage medium of an image pickup apparatus is more expensive in the cost per storage capacity than a storage medium (a hard disk, an MO (magnetooptical) disk or the like) of a computer. Accordingly, an image pickup apparatus is usually utilized in the sequence of "a photographing operation→transfer of image data to a computer→storage of the transferred data in a storage medium of the computer".

The size of image data is relatively large from among the sizes of data dealt with in a computer, and is increasing year by year in accordance with an increase in the number of pixels of an image photographed by an image pickup apparatus. Accordingly, a certain amount of waiting time is produced when the user intends to transfer images to a computer at a time after returning from photographing operations.

A filing system is constructed on a storage medium mounted in an image pickup apparatus, so that images are recorded in the form of files. Similarly, a computer records images in the form of files. That is, transfer of image data from the image pickup apparatus to the computer can be considered as transfer of files.

Conventionally, when a waiting time is produced in file transfer (including in this case copying of files), a display indicating the degree of progress is performed. That is, the degree of completion in the entire transfer processing is indicated, for example, by a percentage, during the waiting time. The user can thereby know an approximate remaining time until completion of transfer (end of the waiting time). Such a display will be hereinafter termed a "transfer-progress display".

The transfer-progress display is performed according to the following two approaches.

(1) Transfer-progress display based of the number of a file.

(2) Transfer-progress display based of the size of files (=the size of transferred data).

The two approaches are realized in the following manners.

(1) Transfer-progress display based of the number of a file

This display is used, for example, when assigning a plurality of (a large amount of) files on a window for displaying files on the picture surface of a computer, and copying a file to another folder. The total number of files to be transferred is first checked before the start of transfer, and the transfer-progress display is updated every time a file is copied.

(2) Transfer-progress display based of the size of files

This display is used, for example, when downloading a file in an Internet browser. The size of a file to be transferred is first acquired before the start of transfer, and the transfer-progress display is updated whenever necessary during the transfer, based on the size of received data.

A transfer-progress display during image transfer from an image pickup apparatus to a computer will now be considered. In any of the above-described approaches (1) and (2), if a large amount of images to be transferred are present, a delay from the start of transfer processing to a transfer-progress display is produced, because of the following reasons.

(1) In the case of a transfer-progress display based of the number of a file

For example, problems arise when selecting a command such as "transfer all images" in software of image transfer from an image pickup apparatus, which operates in a computer. In this case, the software in the computer does not know the number of images within the image pickup apparatus. In order to acquire the number, the software requests the image pickup apparatus to transmit a summary of image files. The image pickup apparatus counts the number of images to be transmitted, in response to this request. The computer knows the number of images within the image pickup apparatus only after receiving a response to the request, and assumes a state in which a transfer-progress display can be performed. However, since, for example, the image pickup apparatus has a processing speed lower than the processing speed of the computer, a flash memory has an access speed lower than the access speed of an ordinary DRAM (dynamic random access memory), and there is a limitation in the transfer speed between the image pickup apparatus and the computer, a certain amount of time is required from provision of the request until reception of a response if a large amount of image files are present.

(2) In the case of a transfer-progress display based of the size of files

Software of image transfer from an image pickup apparatus, which operates in a computer must know the total size of data to be transferred (file sizes), when intending to perform a transfer-progress display according to this approach. For that purpose, it is necessary to provide the image pickup apparatus with a request to transmit file sizes for all images to be transmitted. Upon reception of the request, the image pickup apparatus calculates the total amount of data of image files to be transmitted from a filing system, and transmits a response to the computer. Accordingly, when a large amount of files to be transmitted are present, a considerable amount of time is required for acquiring the size of all data to be transferred (=the sum of file sizes of all images to be transferred).

The object of the transfer-progress display is to display a progress of image transfer whenever necessary during image transfer because a considerable time is required for transferring the entire images. Accordingly, the transfer-progress display becomes meaningless if a considerable time is required from the start of processing until the transfer-progress display appears.

SUMMARY OF THE INVENTION

It is an object of the present invention to solve all or at least one of the above-described problems.

It is another object of the present invention to perform a transfer-progress display as soon as possible immediately after the start of transfer processing.

It is still another object of the present invention to provide an information processing system, an information processing apparatus, an image pickup system, an information processing method and a program, in which a status of transfer progress can be simply and promptly obtained even when transferring a large amount of images from an image pickup apparatus to a computer.

According to one aspect, the present invention which achieves these objectives relates to an information processing system for transferring a data file between information processing apparatuses, each including a storage device. The system includes transmission-directory acquisition means for acquiring a number of transmission directories having each data file to be transmitted as a subordinate directory, transmitted-directory acquisition means for acquiring a number of transmitted directories having each transmitted data file as a subordinate directory, and first generation means for generating a signal indicating a status of progress of transfer of data files, based on the number of transmission directories acquired by the transmission-directory acquisition means and the number of transmitted directories acquired by the transmitted-directory acquisition means.

It is yet another object of the present invention to allow selection of the above-described method of indicating a status of progress whenever necessary, and to allow more suitable indication of a status of progress in accordance with the number and the configuration of image files to be transferred and the configuration of an apparatus.

In one embodiment, the system also includes second generation means for generating a signal indicating a status of progress of data transfer based on a number of data files to be transmitted and a number of transmitted data files. The first generation means and the second generation means are switchable.

In another embodiment, the system also includes third generation means for generating a signal indicating a status of progress of data transfer based on a total amount of data of data files to be transmitted and a total amount of data of transmitted data files. The first generation means and the third generation means are switchable.

In still another embodiment, switching between the first generation means and the second generation means, or switching between the first generation means and the third generation means is performed in accordance with a display capability of a display device for displaying the status of transfer progress.

According to still another aspect, the present invention which achieves these objectives relates to an information processing apparatus for transferring a data file to an external apparatus including a storage device. The apparatus includes transmission-directory acquisition means for acquiring a number of transmission directories having each data file to be transmitted as a subordinate directory, transmitted-directory acquisition means for acquiring a number of transmitted directories having each transmitted data file as a subordinate directory, and generation means for generating a signal indicating a status of progress of transfer of data files, based on the number of transmission directories acquired by the transmission-directory acquisition means and the number of transmitted directories acquired by the transmitted-directory acquisition means.

According to still another aspect, the present invention which achieves these objectives relates to an information processing apparatus for receiving a data file from an external apparatus including a storage device. The apparatus includes transmission-directory acquisition means for acquiring a number of transmission directories having each data file to be transmitted as a subordinate directory, transmitted-directory acquisition means for acquiring a number of transmitted directories having each transmitted data file as a subordinate directory, and generation means for generating a signal indicating a status of progress of transfer of data files, based on the number of transmission directories acquired by the transmission-directory acquisition means and the number of transmitted directories acquired by the transmitted-directory acquisition means.

According to still another aspect, the present invention which achieves these objectives relates to an information processing system for transferring a data file between information processing apparatuses, each including a storage device. The system includes first acquisition means for acquiring a capacity of use of a storage device of an information processing apparatus serving as a transfer source, second acquisition means for acquiring an amount of data whose transfer has been completed, and calculation means for calculating a degree of progress based on a comparison between the capacity of use acquired by the first acquisition means and the amount of data acquired by the second acquisition means.

According to still another aspect, the present invention which achieves these objectives relates to an image pickup system including an image pickup apparatus including a storage device, an information processing apparatus, and a communication channel through which data can be transferred between the image pickup apparatus and the information processing apparatus. When transferring image files within the storage device of the image pickup apparatus to the information processing apparatus at a time, a degree of progress based on a comparison between a total number of transmission directories having each image file to be transmitted as a subordinate directory and a total number of transmitted directories having each transferred image file as a subordinate directory is displayed.

According to still another aspect, the present invention which achieves these objectives relates to an image pickup system including an image pickup apparatus including a storage device, an information processing apparatus, and a communication channel through which data can be transferred between the image pickup apparatus and the information processing apparatus. When transferring image data within the storage device of the image pickup apparatus to the information processing apparatus at a time, a degree of progress is displayed based on a comparison between a capacity of use of the storage device of the image pickup apparatus and an amount of transferred image data.

According to still another aspect, the present invention which achieves these objectives relates to an information processing method for transferring a data file between information processing apparatuses, each including a storage device. The method includes a transmission-directory acquisition step of acquiring a number of transmission directories having each data file to be transmitted as a subordinate directory, a transmitted-directory acquisition step of acquiring a number of transmitted directories having each transmitted data file as a subordinate directory, and a first generation step of generating a signal indicating a status of progress of transfer of data files, based on the number of transmission directories acquired in the transmission-directory acquisition step and the number of transmitted directories acquired in the transmitted-directory acquisition step.

According to still another aspect, the present invention which achieves these objectives relates to an information processing method for transferring a data file between information processing apparatuses, each including a storage device. The method includes a first acquisition step of acquiring a capacity of use of a storage device of an information processing apparatus serving as a transfer source, a second acquisition step of acquiring an amount of data whose transfer has been completed, and a display step of displaying a degree of progress based on a comparison between the capacity of use acquired in the first acquisition step and the amount of data acquired in the second acquisition step.

According to still another aspect, the present invention which achieves these objectives relates to a program, capable of being executed by a computer, for realizing any one of the above-described information processing methods.

According to still another aspect, the present invention which achieves these objectives relates to an information processing method for sequentially processing a plurality of data files stored in a storage device. The method includes a processing-directory acquisition step of acquiring a number of transmission directories having each data file to be processed as a subordinate directory, a processed-directory acquisition step of acquiring a number of processed directories having each processed data file as a subordinate directory, and a first generation step of generating a signal indicating a status of progress of processing of data files, based on the number of processing directories acquired in the processing-directory acquisition step and the number of processed directories acquired in the processed-directory acquisition step.

According to still another aspect, the present invention which achieves these objectives relates to an information processing method for sequentially processing a plurality of data files stored in a storage device. The method includes a first acquisition step of acquiring a capacity of use of the storage device, a second acquisition step of acquiring an amount of data whose processing has been completed, and a display step of displaying a degree of progress based on a comparison between the capacity of use acquired in the first acquisition step and the amount of data acquired in the second acquisition step.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS (First Embodiment)

Figure 1:
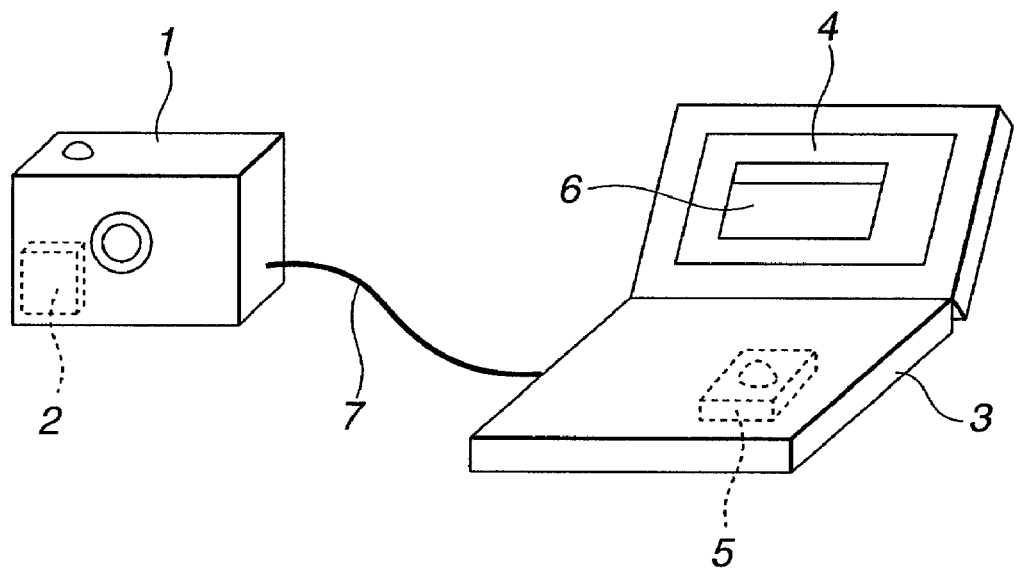
FIG. 1 is a diagram illustrating the entire configuration of a system according to a first embodiment of the present invention.

FIG. 1 is a diagram illustrating the configuration of a system according to a first embodiment of the present invention. In FIG. 1, there are shown an image pickup apparatus 1, and a storage medium (a flash-memory card or the like) 2 mounted in the image pickup apparatus 1. Reference numeral 3 represents a computer. The computer 3 performs display on a display 4. A storage device (a hard disk, an MO disk or the like) 5 is incorporated or mounted in the computer 3. Image-transfer software 6 including procedures according to the present invention operates in the computer 3. Communication and transfer between the image pickup apparatus 1 and the computer 3 is performed through a communication channel 7. The communication channel 7 is a channel according to wired communication or radio communication, or via a network (a LAN (local area network) or the Internet).

A filing system is constructed in the storage medium 2. The image pickup apparatus 1 records data of a photographed image in the storage medium 2 as a file. Hereafter, an "image within the digital camera 1" indicates an image file recorded in the storage medium 2.

Figure 2:
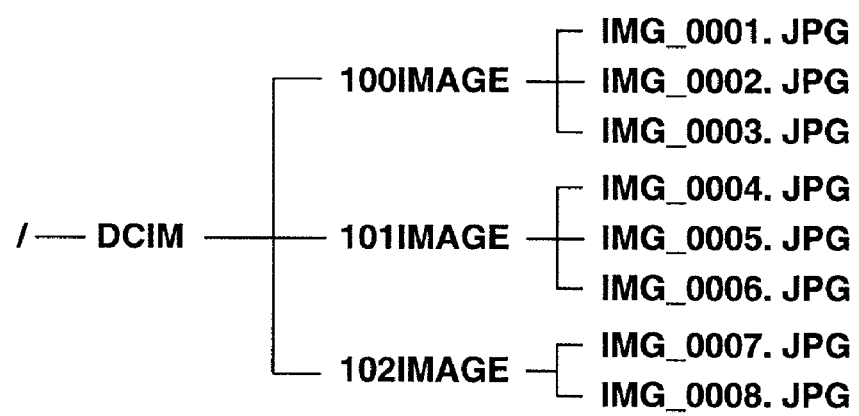
FIG. 2 is a diagram illustrating the configuration of directories at a transfer source.

In contrast to a storage device in a computer where the user freely forms a file or a directory, the configuration of directories in the storage medium 2 is defined by standards or specifications. FIG. 2 illustrates an example of the configuration of directories.

In the case of FIG. 2, a DCIM directory is present below a root, and a plurality of xxxIMAGE directories (xxx represents a serial number set by the system, or an arbitrarily set number) are present below the DCIM directory. Image files (IMG_xxxx.JPG) are present below each xxxIMAGE directory. The image pickup apparatus 1 records each photographed image below a xxxIMAGE directory. When a constant number of files have been stored in the directory, a xxxIMAGE directory is newly formed (for example, a 101IMAGE directory is formed after a 100IMAGE directory), and files are recorded in the new directory. The constant number is usually several tens to several hundreds. In the case of FIG. 2, however, the constant number is three from a restriction in space. In FIG. 2, only eight images are shown from a restriction in space. However, the present invention assumes a state in which a large number of images, for example, several hundreds to several thousands of images, are present.

Accordingly, if it is assumed that N images are recorded within the storage medium 2 with a specification of storing maximum M image files in one xxxIMAGE file, N/M (rounding up any numerical value after the decimal point) xxxIMAGE directories are present below the DCIM directory.

Consider a situation in which the user using the image-transfer software 6 executes a function of "transfer of all images within the image pickup apparatus at a time". As explained in the description of the related art, in order to perform a transfer-progress display in units of a file, it is necessary to first inquire and acquire the total number of image files within the storage medium 2 from the image pickup apparatus 1.

In the first embodiment, however, a signal indicating the state of transfer progress is generated in units of a xxxIMAGE directory, and a display indicating the degree of progress is performed using a progress bar or the like.

That is, the number of transmission directories having each data file to be transmitted as a subordinate directory is acquired, and the number of transmitted directories having each transmitted data file as a subordinate directory is also acquired (a directory all of whose subordinate data files to be transmitted have been transmitted is recognized as a transmitted directory).

By comparing the number of transmission directories and the number of transmitted directories thus obtained with each other, the ratio of transmitted directories to the number of transmission directories may be calculated and displayed, or the difference between the number of transmission directories and the number of transmitted directories may be displayed, in order to be able to recognize to what degree transmission has been completed.

Every time transfer of subordinate image files of one xxxIMAGE directory has been completed, the transfer-progress display is updated. In this case, the total number of xxxIMAGE directories is asked to and acquired from the image pickup apparatus 1. This can be performed in a much shorter time than in the case of acquiring the number of all image files (more specifically, the time is shortened by about 1/M).

Instead, accuracy in the transfer-progress display (fineness in updating of display) is degraded (to about 1/M). However, since it is only necessary to know an approximate status of progress in the transfer-progress display, no problem will arise.

This approach can be realized because the configuration of directories in a filing system of a transfer source is provided, and files are equally provided below each xxxIMAGE directory the number of whose subordinate files has reached a recordable number (of course, in a directory the number of whose subordinate files does not yet reach the recordable number, the files are not equally provided).

Figure 3:
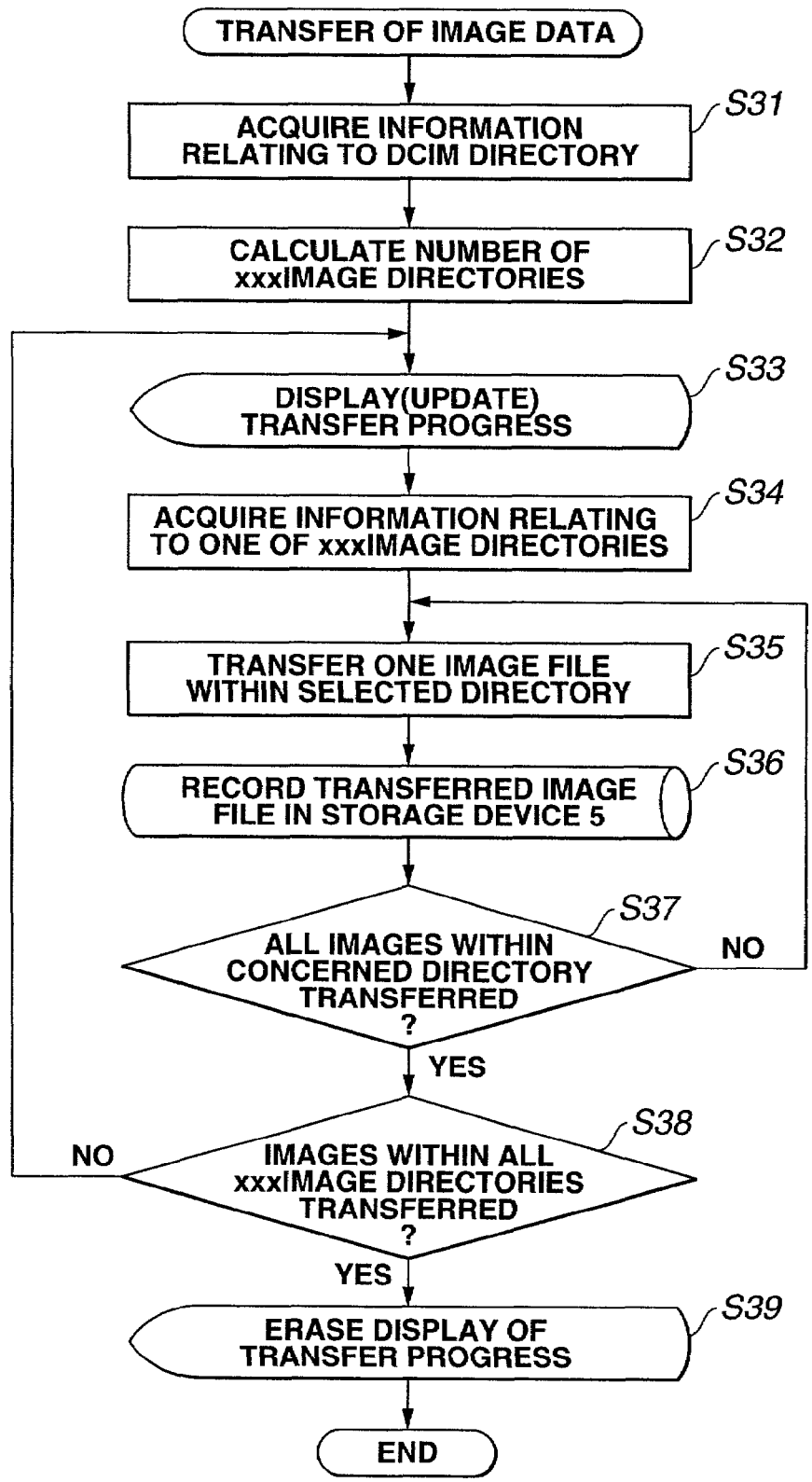
FIG. 3 is a flowchart illustrating an operation for a transfer-progress display in the first embodiment.

FIG. 3 illustrates a procedure when performing a transfer-progress display according to the above-described approach.

When the function of "transfer of all images within the image pickup apparatus at a time" has been instructed by the user, the image-transfer software 6 acquires information relating to the DCIM directory (step S31). The information relating to the DCIM directory is additional information relating to child directories and child files of the DCIM directory, a time stamp of each of these child components, and the like. This information is acquired by asking the image pickup apparatus 1 and receiving a response from the image pickup apparatus 1 via the communication channel 7.

The number of xxxIMAGE directories below the DCIM directory is calculated based on the information acquired in step S31 (step S32).

Figure 4:
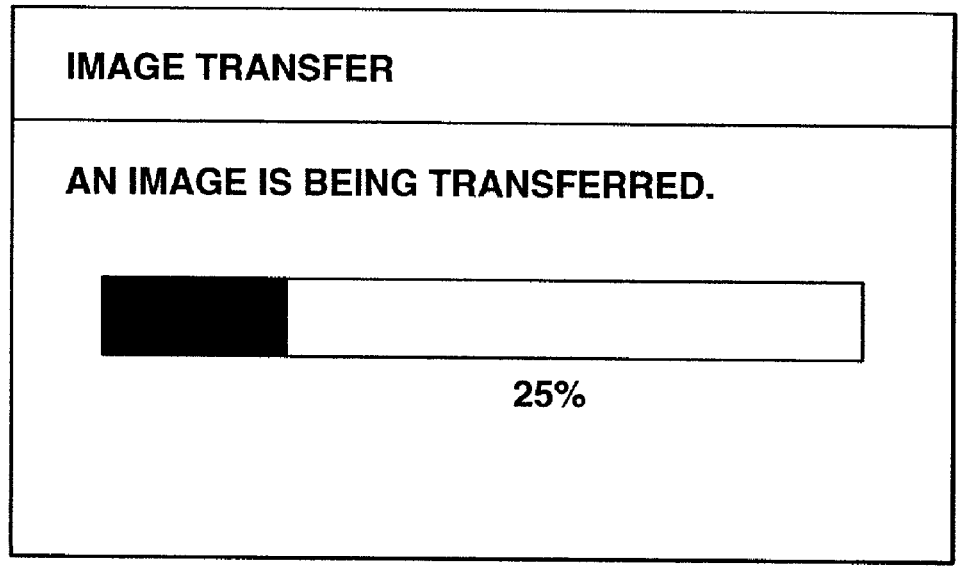
FIG. 4 is a diagram illustrating a transfer-progress display.

Then, a transfer-progress display is displayed (step S33). FIG. 4 illustrates an example of the transfer-progress display. The degree of progress displayed on the picture surface is calculated by (the number of xxxIMAGE directories whose transfer has been completed)/(the total number of xxxIMAGE directories)×100(%).

Noticing one of the xxxIMAGE directories, information relating to this directory, i.e., information relating to child directories and child files of this directory, and additional information relating to these child components, is acquired from the image pickup apparatus 1 (step S34).

An image file within this directory is transferred from the image pickup apparatus 1 based on the information obtained in step S34 (step S35), and is recorded in the storage device 5 (step S36). This operation is repeated for all image files within the directory (step S37).

If there remains at least one untransferred xxxIMAGE directory after completing the transfer of images within one xxxIMAGE directory, the process returns to step S33, where the transfer-progress display is updated, and transfer of images within the remaining directory is performed. When all xxxIMAGE directories have been transferred, the transfer-progress display is erased (step S39), and the process is terminated.

According to the above-described approach, all images within the image pickup apparatus 1 can be transferred while updating the transfer-progress display in units of a xxxIMAGE directory.

Although in the first embodiment, the case of transfer between the image pickup apparatus and the computer has been described, the present invention is not limited to such a configuration, but may be applied to transfer of files between general electronic apparatuses.

(Second Embodiment)

The configuration of a second embodiment of the present invention is the same as in the first embodiment shown in FIG. 1.

In the second embodiment, before performing transfer from the image pickup apparatus 1 to the computer 3, the capacity of use of the storage device 2 is first acquired, and a transfer-progress display is performed by comparing the acquired value with the amount of transferred data.

In addition to image files, data of each image instructed to be printed by the user, and information necessary for the filing system itself (directory information and the like) are present in the storage medium 2. However, most of the capacity of the storage device 2 is occupied by the files of photographed images. Accordingly, (the capacity of use of the storage medium 2)≈(the amount of data of all photographed images), so that sufficient accuracy for performing a transfer-progress display is provided.

Figure 5:
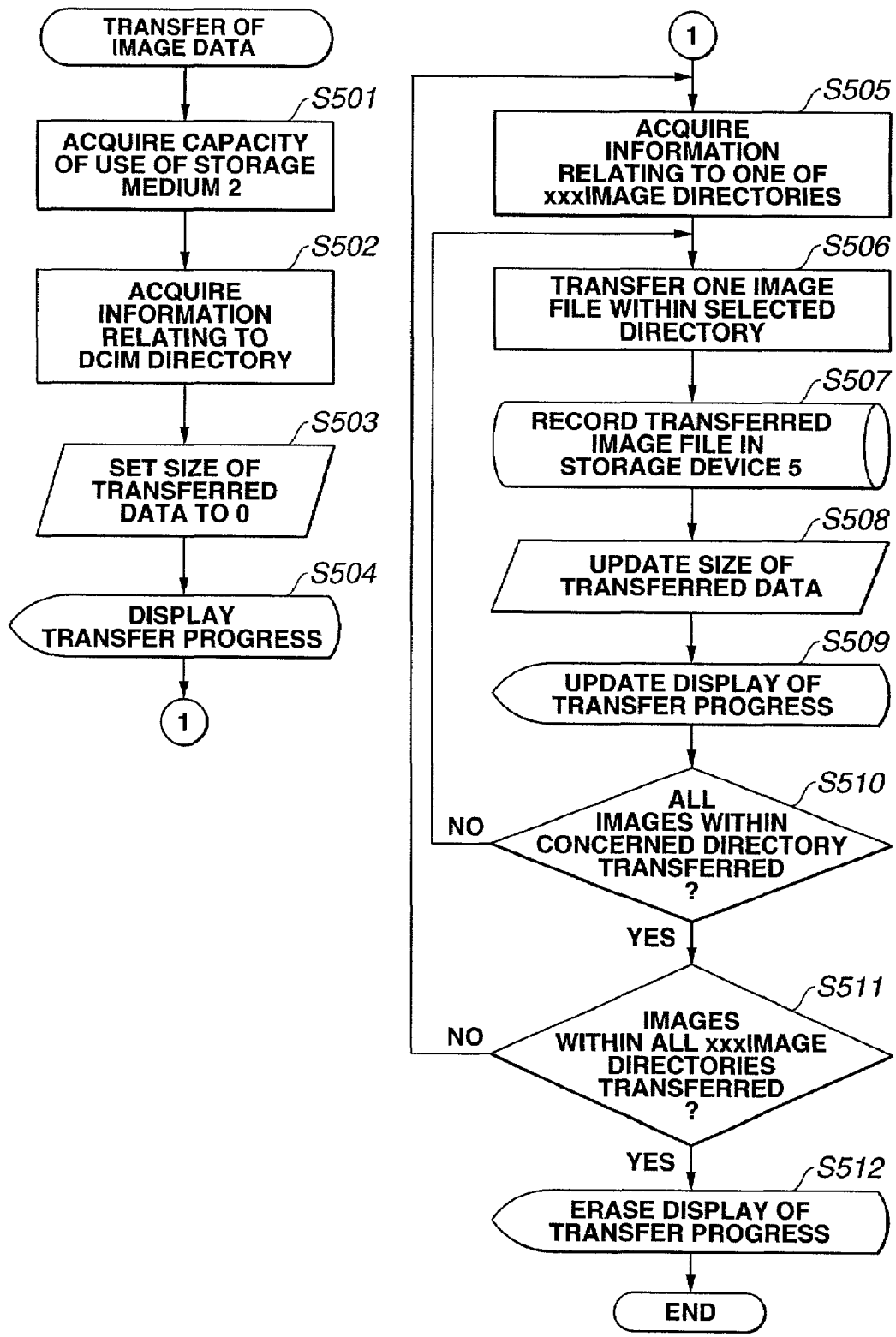
FIG. 5 is a flowchart illustrating an operation for a transfer-progress display in a second embodiment of the present invention.

FIG. 5 is a flowchart of the procedure of the second embodiment. When the user has instructed the image-transfer software 6 to transfer all images within the image pickup apparatus 1 at a time, the contents shown in FIG. 5 are executed.

First, by asking the image pickup apparatus 1 about the capacity of use of the storage device 2 and receiving a response from the storage device 2, the capacity of use is acquired (step S501). If the filing system of the storage device 2 is a type of being incapable of directly acquiring the capacity of use, the total capacity and an empty capacity are acquired, and the capacity of use is obtained by (the capacity of use)=(the total capacity)−(the empty capacity).

Then, information relating to the DCIM directory is acquired form the image pickup apparatus 1 (step S502). Thus, all xxxIMAGE directories below the DCIM directory are known.

The size of transferred data is set to 0 (step S503). The size of transferred data is used for displaying transfer progress together with the capacity of use acquired in step S501.

A transfer-progress display is performed (step S504). The degree of progress displayed at that time is, of course, 0.

One of the xxxIMAGE directories obtained in step S502 is selected, and information relating to the selected directory is acquired from the image pickup apparatus 1 (step S505). Thus, a summary of files present in the xxxIMAGE directory is obtained.

One image file in the xxxIMAGE directory is transferred (step 8506), and is stored in the storage device 5 (step S507). Then, the size of transferred data is updated (step S508). In the updating, the size of just transferred data is added to the size of transferred data. The transfer-progress display is updated based on the updated size of transferred data (step S509). The degree of progress displayed in this case is calculated by (the size of transferred data)/(the capacity of use of the recording medium 2)×100(%).

The processing of steps S506–S510 is repeated until all images in the xxxIMAGE directory are transferred. Then, the processing of steps S505–S511 is repeated until all xxxIMAGE directories are transferred. Thus, all images within the storage medium 2 are transferred.

When the transfer has been completed, the transfer-progress display is erased (step S512), and the process is terminated.

Any appropriate approach other that the above-described approach, for example, an approach of performing a display approach based on the difference, may also be adopted. Alternatively, only a numeral may be displayed. It is only necessary to be able to recognize an approximate status of progress.

According to any one of the above-described approaches, it is possible to update the transfer-progress display every time a file has been transferred.

Although the second embodiment illustrates the case of transfer between the image pickup apparatus and the computer, the second invention is not limited to this configuration. The second embodiment may be applied to file transfer between general electronic apparatuses.

The foregoing description has been performed assuming that the storage medium 2 is mostly used. More specifically, the second embodiment is preferably applied to a case in which data is recorded in at least a predetermined capacity (close to a most capacity, for example, 90%) of the entire storage capacity.

If data is recorded in a capacity less than the predetermined capacity, switching may be performed so as to adopt the approach of the first embodiment.

(Third Embodiment)

Figure 6:
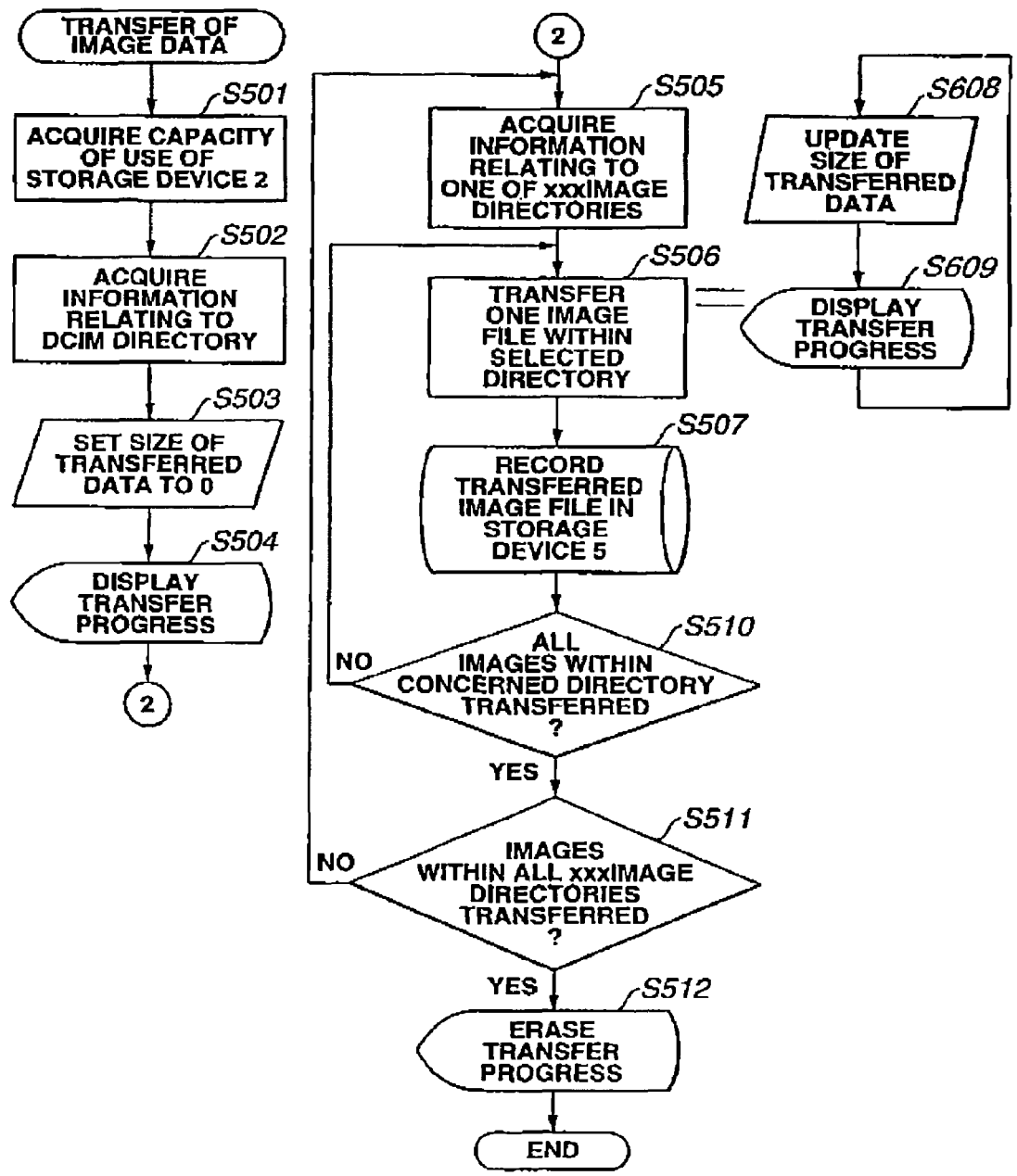
FIG. 6 is a flowchart illustrating an operation for a transfer-progress display in a third embodiment of the present invention.

FIG. 6 illustrates a flowchart illustrating a third embodiment of the present invention.

In the third embodiment, only steps S508 and S509 in the second embodiment are replaced by steps S608 and S609, respectively. The steps S608 and S609 are executed in parallel during transfer of an image file (step S506). Even during transfer of the file, the size of transferred data is updated whenever necessary in accordance with transferred data, and the transfer-progress display is also updated. Accordingly, in contrast to the second embodiment in which the transfer-progress display is updated every time transfer of one file has been completed, in the third embodiment, the transfer-progress display is updated without cease even during transfer of a file.

Although the third embodiment illustrates transfer between an image pickup apparatus and a computer, the third embodiment is not limited to this configuration. The third embodiment may also be applied to file transfer between general electronic apparatuses.

The transmission directory and the transmitted directory used in the foregoing description may be a directory dedicatedly set for transmission and a directory dedicatedly set for completed transmission. However, the setting is not limited to such setting.

A preset directory name be used whether a corresponding directory is to be transmitted or not, and a directory where a file to be transmitted is present at a subordinate position may be used as the above-described transmission directory. Similarly, a directory where a transmitted file is present at a subordinate position may be used as the above-described transmitted directory.

Although in the foregoing embodiments, the case of transmitting all images within the storage device at a time has been described, the present invention may also be applied to case in which the user transmits a plurality of selected images.

In this case, the number of transmission directories and transmitted directories, each having at least one image to be transmitted present at a subordinate position, may be obtained.

In another approach, switching may be appropriately performed between the approach 1 (in which a transfer-progress display is performed in units of a file) and the approach 2 (in which a transfer-progress display is performed in units of a file size) which have been described above, in accordance with the user's taste or the state of use.

For example, when the number of transmission directories, each having at least one data file to be transmitted at a subordinate position is small, or when there is a large difference between the number of data files present below a certain directory and the number of data files present below a different directory, updating in the status of progress is apt to vary. That is, updating may become abruptly fast or slow.

Accordingly, when it is intended to know a more exact status of progress although much time is required, an appropriate predetermined threshold may be provided for each of the number of files and the number of directories, and an approach of checking the status of progress may be appropriately switched between the approach of the present invention, and the approach 1 (in which a transfer-progress display is performed in units of a file) or the approach 2 (in which a transfer-progress display is performed in units of a file size), in accordance with the difference between these thresholds.

Alternatively, the approach of checking the status of progress may be switched depending on the display capability of a display unit for displaying the status of progress.

For example, when the number of transmission directories is only about ten, and a display in which the status-progress display can be updated in 100 steps from 0% to 100%, updating of the display tends to become abruptly fast or slow. In such a case, by obtaining the degree of progress based on the number of data files which are larger in the number, a display suitable for the display capability can be performed.

On the other hand, when, for example, 10,000 image files are present, even if the degree of progress is updated every time a file has been transmitted, updating of display is performed at only about one hundredth of updating of the degree of progress because the display has only 100 steps.

In such a case, since a useless calculation processing is performed, the degree of progress may be checked based on the number of transmission directories, from the viewpoint of reducing the load of processing of the apparatus.

Switching of the method for checking the degree of progress depending of the display capability of the display unit in the above-described manner is also effective.

In the above-described embodiments, for example, the number of directories is requested to a digital camera which is connected to a personal computer, or the status of progress is displayed on a display device of the personal computer, by control at the personal computer, such processing may be performed by control at the digital camera.

That is, the number of directories in the personal computer may be independently transmitted from the digital camera, or the status of progress may be displayed on a display device of the digital camera.

Furthermore, the above-described embodiments may be applied not only to the case of transferring image data from the digital camera to the personal computer, but also at both of the transmission side and the reception side of an information processing system for transferring a data file between information processing apparatuses, each including a storage device.

However, in a file format called a DCF (Design rule for Camera File system R) adopted at the digital camera, the number of files which can be recorded in one directory is fixed, so that the above-described embodiments may be suitably utilized.

If the capacity of a storage medium, such as a memory card or the like, increases, the number of recorded images and the number of directories necessarily increases, so that the above-described embodiments may be more suitably utilized.

The present invention may be applied to a system comprising a plurality of apparatuses (such as a host computer, an interface apparatus, a reader, a printer and the like), or to an apparatus comprising a single unit (such as a copier, a facsimile apparatus or the like).

A case of supplying a computer within an apparatus or a system connected to various devices so as to operate the devices in order to realize the functions of the above-described embodiments with program codes of software for realizing the functions of the above-described embodiments, and operating the devices in accordance with a program stored in the computer (a CPU (central processing unit) or an MPU (microprocessor unit)) within the apparatus or the system also constitutes the present invention.

In such a case, the program codes themselves of the software realize the functions of the above-described embodiments, so that means for supplying the computer with the program codes, such as a storage medium storing the program codes, also constitutes the present invention.

For example, a floppy disk, a hard disk, an optical disk, a mangetooptical disk, a CD(compact disc)-ROM (read-only memory), a magnetic tape, a nonvolatile memory card, a ROM or the like may be used as the storage medium for storing such program codes.

Such program codes are, of course, included in the above-described embodiments of the present invention not only in a case in which the functions of the above-described embodiments are realized by execution of the supplied program codes by a computer, but also in a case in which the program codes realize the functions of the above-described embodiments in cooperation with an OS (operating system) operating in a computer, any other application software or the like.

A case in which after storing supplied program codes in a memory provided in a function expanding board of a computer or in a function expanding unit connected to the computer, a CPU or the like provided in the function expanding board or the function expanding unit performs a part or the entirety of actual processing based on instructions of the program codes, the functions of the above-described embodiments are realized by the processing is, of course, included in the present invention.

Although in the foregoing description, processing of transferring data files or image files is illustrated, the present invention is not limited to such an approach. For example, the present invention may, of course, be applied to any other image processing, such as reduction, rotation, color correction, printing or the like of an image, file operation processing such as copying or deletion of a file, data compression processing, encoding or the like.

In such image processing or file operation processing, it is also possible to recognize the status of progress and display the status on a display device or the like.

In such a case, the above-described transfer processing may be replaced by predetermined image processing or file operation processing. Hence, a detailed description thereof will be omitted.

As described above, according to the present invention, a signal indicating a status of progress of transfer of data files is output based on the number of transmission directories acquired by transmission-directory acquisition means and the number of transmitted directories acquired by transmitted-directory acquisition means. Hence, even if a large number of photographed images are present within an image pickup device, processing of checking the degree of progress of transmission is less burdened and promptly performed. Furthermore, a display of the degree of progress is not delayed. That is, it is possible to promptly perform a transfer-progress display after an instruction to start transfer.

In a system in which an upper limit is set for the number of data files capable of being stored in each directory, accuracy in the degree of progress is less degraded. Hence, the present invention is suitable.

By switching to a method of checking the status of progress of data transfer based on the number of data files to be transmitted and the number of transmitted data files, or to a method of checking the status of progress of data transfer based on the total amount of data of data files to be transmitted and the total number of data of transmitted data files, it is possible to switch the method for checking the degree of progress depending on a situation, for example, a situation in which accuracy is required.

By switching the method for checking the status of transfer progress in accordance with the display capability of a display device for displaying the number of transmission directories or the status of transfer progress, an appropriate degree of progress can be provided depending on the situation.

The degree of progress is determined by acquiring the capacity of use of a storage device of an information processing apparatus, serving as a transfer source, and the amount of transferred data and obtaining the ratio between these amounts. Hence, even when transferring a large amount of data files, it is unnecessary to calculate the capacity for each file, and it is possible to check the degree of progress with simple processing.

That is, processing of determining the degree of transfer progress is less burdened and promptly performed. Furthermore, a display of the degree of progress is not delayed. That is, a transfer-progress display can be promptly performed after instructing to start transfer.

The present invention is suitable for a case in which a digital camera is used as an apparatus at the transmission side.

Transmission of images of a digital camera to a computer is frequently performed. Recently, the number of images recorded in a recording medium of the digital camera is increasing to several hundreds to several thousands. Even if start of display of the degree of progress is delayed in accordance with an increase in the number of images to be transferred, the present invention can sufficiently deal with. Since the calculation processing capability of a digital camera is relatively low compared with that of a computer, the present invention in which a load in calculation can be reduced is very suitable.

The individual components shown in outline in the drawings are all well known in the information processing and image-pickup arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing system for transferring a data file between information processing apparatuses, each including a storage device, said system comprising:
   transferring means for transferring data files between the information processing apparatuses; and
   transfer progress display means, comprising:
   transmission-directory acquisition means for acquiring a number of transmission directories having each data file to be transmitted as a subordinate directory;
   transmitted-directory acquisition means for acquiring a number of transmitted directories having each transmitted data file as a subordinate directory; and
   first generation means for generating a signal indicating a status of progress of transfer of data files, based on the number of transmission directories acquired by said transmission-directory acquisition means and the number of transmitted directories acquired by said transmitted-directory acquisition means, wherein a display of the status of progress of transfer is updated continuously at asynchronous intervals during transfer of the data file, and
   wherein the transferring means and the transfer progress display means are executed separately but in parallel to one another.

2. A system according to claim 1, wherein said first generation means comprises calculation means for calculating a degree of progress from a comparison between the number of transmission directories and the number of transmitted directories.

3. A system according to claim 2, further comprising display means for displaying the degree of progress.

4. A system according to claim 1, wherein an upper limit is set for a number of data files capable of being stored in each directory.

5. A system according to claim 3, wherein a display of the degree of progress is further updated every time transfer of all data files in one directory bas been completed.

6. A system according to claim 1, further comprising second generation means for generating a signal indicating a status of progress of data transfer based on a number of data files to be transmitted and a number of transmitted data files, wherein said first generation means and said second generation means are switchable.

7. A system according to claim 6, wherein switching between said first generation means and said second generation means is performed in accordance with the number of transmission directories.

8. A system according to claim 6, wherein switching between said first generation means and said second generation means is performed in accordance with a display capability of a display device for displaying the status of transfer progress.

9. A system according to claim 1, further comprising third generation means for generating a signal indicating a status of progress of data transfer based on a total amount of data of data files to be transmitted and a total amount of data of transmitted data files, wherein said first generation means and said third generation means are switchable.

10. A system according to claim 9, wherein switching between said first generation means and said third generation means is performed in accordance with the number of transmission directories.

11. A system according to claim 9, wherein switching between said first generation means and said third generation means is performed in accordance with a display capability of a display device for displaying the status of transfer progress.

12. A system according to claim 1, wherein a destination of data-file transfer is a digital camera.

13. An information processing apparatus for transferring a data file to an external apparatus including a storage device, said apparatus comprising:
   transferring means for transferring data files to the external apparatus; and
   transfer progress display means, comprising:
   transmission-directory acquisition means for acquiring a number of transmission directories having each data file to be transmitted as a subordinate directory;
   transmitted-directory acquisition means for acquiring a number of transmitted directories having each transmitted data file as a subordinate directory; and
   generation means for generating a signal indicating a status of progress of transfer of data files, based on the number of transmission directories acquired by said transmission-directory acquisition means and the number of transmitted directories acquired by said transmitted-directory acquisition means, wherein a display of the status of progress of transfer is updated continuously at asynchronous intervals during transfer of the data file, and
   wherein the transferring means and the transfer progress display means are executed separately but in parallel to one another.

14. An apparatus according to claim 13, wherein said generation means comprises calculation means for calculating a degree of progress from a comparison between the number of transmission directories and the number of transmitted directories.

15. An apparatus according to claim 14, further comprising display means for displaying the degree of progress.

16. An apparatus according to claim 13, further comprising image pickup means.

17. An information processing apparatus for receiving a data file from an external apparatus including a storage device, said apparatus comprising:
   receiving means for receiving data files transferred by the external apparatus; and
   transfer progress display means, comprising:
   transmission-directory acquisition means for acquiring a number of transmission directories having each data file to be transmitted as a subordinate directory;
   transmitted-directory acquisition means for acquiring a number of transmitted directories having each transmitted data file as a subordinate directory; and
   generation means for generating a signal indicating a status of progress of transfer of data files, based on the number of transmission directories acquired by said transmission-directory acquisition means and the number of transmitted directories acquired by said transmitted-directory acquisition means, wherein a display of the status of progress of transfer is updated continuously at asynchronous intervals during transfer of the data file, and wherein the receiving means and the transfer progress display means are executed separately but in parallel to one another.

18. An apparatus according to claim 17, wherein said generation means comprises calculation means for calculating a degree of progress from a comparison between the number of transmission directories and the number of transmitted directories.

19. An apparatus according to claim 18, further comprising display means for displaying the degree of progress.

20. An apparatus according to claim 17, wherein a destination of data-file transfer is a digital camera.

21. An information processing system for transferring a data file between information processing apparatuses, each including a storage device, said system comprising:
transferring means for transferring data files between the information processing apparatuses; and
transfer progress display means, comprising:
first acquisition means for acquiring a capacity of use of a storage device of an information processing apparatus serving as a transfer source;
second acquisition means for acquiring an amount of data whose transfer has been completed; and
calculation means for calculating a degree of progress based on a comparison between the capacity of use acquired by said first acquisition means and the amount of data acquired by said second acquisition means, wherein a display of the degree of progress is updated continuously at asynchronous intervals during transfer of the data file, and
wherein the transferring means and the transfer progress display means are executed separately but in parallel to one another.

22. A system according to claim 21, wherein most of the capacity of use of the storage device of the information processing apparatus, serving as the transfer source, is occupied by data to be transferred.

23. A system according to claim 21, wherein, when transferring data at a time, first, the capacity of use of the storage device of the information processing apparatus, serving as the transfer source, is acquired.

24. A system according to claim 21, wherein the degree of progress is updated every time transfer of one data file has been completed.

25. A system according to claim 21, further comprising display means for displaying the degree of progress.

26. An image pickup system comprising:
an image pickup apparatus including a storage device;
an information processing apparatus; and
a communication channel through which data can be transferred between said image pickup apparatus and said information processing apparatus by a transferring unit,
wherein, when transferring, by the transferring unit, image files within the storage device of said image pickup apparatus to said information processing apparatus at a time, a degree of progress is calculated by a transfer progress display unit based on a comparison between a total number of transmission directories having each image file to be transmitted as a subordinate directory and a total number of transmitted directories having each transferred image file as a subordinate directory, and the transfer progress is displayed and updated continuously at asynchronous intervals during transfer of the image file, wherein the transferring unit and the transfer progress display unit are executed separately but in parallel with one another.

27. A system according to claim 26, wherein an upper limit is set for a number of data files stored in each directory.

28. A system according to claim 26, wherein, when transferring image files at a time, information relating to directories stored in the storage device of said image pickup apparatus is acquired in advance, and a display of the degree of progress is updated every time transfer of all image files in one directory has been completed.

29. An image pickup system comprising:
an image pickup apparatus including a storage device;
an information processing apparatus; and
a communication channel through which data can be transferred between said image pickup apparatus and said information processing apparatus by a transferring unit,
wherein, when transferring, by the transferring unit, image data within the storage device of said image pickup apparatus to said information processing apparatus at a time, a degree of progress is calculated by a transfer progress display unit based on a comparison between a capacity of use of the storage device of said image pickup apparatus and an amount of transferred image data, and the transfer progress is displayed and updated continuously at asynchronous intervals during transfer of the image data, wherein the transferring unit and the transfer progress display unit are executed separately but in parallel with one another.

30. A system according to claim 29, wherein most of the capacity of use of the storage device of said image pickup apparatus is occupied by image data.

31. A system according to claim 29, wherein, when transferring image data at a time, the capacity of use of the storage device of said image pickup apparatus is acquired in advance.

32. A system according to claim 29, wherein the degree of progress is calculated and a display is updated every time transfer of one image file has been completed.

33. A system according to claim 29, wherein during transfer of image data, a total size of transferred image data is calculated and a display is updated continuously.

34. An information processing method for transferring a data file between information processing apparatuses, each including a storage device, said method comprising:
a transferring step of transferring data files between the information processing apparatuses; and
a transfer progress display step, comprising:
a transmission-directory acquisition step of acquiring a number of transmission directories having each data file to be transmitted as a subordinate directory;
a transmitted-directory acquisition step of acquiring a number of transmitted directories having each transmitted data file as a subordinate directory; and
a first generation step of generating a signal indicating a status of progress of transfer of data files, based on the number of transmission directories acquired in said transmission-directory acquisition step and the number of transmitted directories acquired in said transmitted-directory acquisition step, wherein a display of the status of progress of transfer is updated continuously at asynchronous intervals during transfer of the data file, and
wherein the transferring step and the transfer progress display step are executed separately but in parallel with one another.

35. A method according to claim 34, wherein said first generation step comprises a calculation step of calculating a degree of progress from a comparison between the number of transmission directories and the number of transmitted directories.

36. A method according to claim 34, further comprising a display control step of causing a display device to display the degree of progress.

37. A method according to claim 34, wherein an upper limit is set for a number of data files capable of being stored in each directory.

38. A method according to claim 34, wherein a display of the degree of progress is further updated every time transfer of all data files in one directory has been completed.

39. A method according to claim 34, further comprising a second generation step of generating a signal indicating a status of progress of data transfer based on a number of data files to be transmitted and a number of transmitted data files, wherein said first generation step and said second generation step are switchable.

40. A method according to claim 39, wherein switching between said first generation step and said second generation step is performed in accordance with the number of transmission directories.

41. A method according to claim 39, wherein switching between said first generation step and said second generation step is performed in accordance with a display capability of a display device for displaying the status of transfer progress.

42. A method according to claim 34, further comprising a third generation step of generating a signal indicating a status of progress of data transfer based on a total amount of data of data files to be transmitted and a total amount of data of transmitted data files, wherein said first generation step and said third generation step are switchable.

43. A method according to claim 42, wherein switching between said first generation step and said third generation step is performed in accordance with the number of transmission directories.

44. A method according to claim 42, wherein switching between said first generation step and said third generation step is performed in accordance with a display capability of a display device for displaying the status of transfer progress.

45. A method according to claim 34, wherein a destination of data-file transfer is a digital camera.

46. An information processing method for transferring a data file between information processing apparatuses, each including a storage device, said method comprising:
   a transferring step of transferring data files between the information processing apparatuses; and
   a transfer progress display step, comprising:
   a first acquisition step of acquiring a capacity of use of a storage device of an information processing apparatus, serving as a transfer source;
   a second acquisition step of acquiring an amount of data whose transfer has been completed; and
   a transfer progress display step of calculating a degree of progress based on a comparison between the capacity of use acquired in said first acquisition step and the amount of data acquired in said second acquisition step, and displaying the transfer progress with the display being continuously updated at asynchronous intervals during transfer of the data file,
   wherein the transferring step and the transfer progress display step are executed separately but in parallel with one another.

47. A computer-readable medium storing a program, capable of being executed by a computer, for realizing an information processing method according to any one of claims 34 through 46.

48. An information processing method for sequentially processing a plurality of data files stored in a storage device, said method comprising:
   sequentially processing the plurality of data files; and
   a processing progress display step, comprising:
   a processing-directory acquisition step of acquiring a number of processing directories having each data file to be processed as a subordinate directory;
   a processed-directory acquisition step of acquiring a number of processed directories having each processed data file as a subordinate directory; and
   a first generation step of generating a signal indicating a status of progress of processing of data files, based on the number of processing directories acquired in said processing-directory acquisition step and the number of processed directories acquired in said processed-directory acquisition step, wherein a display of the status of progress of processing is updated continuously at asynchronous intervals during processing of the data file, and
   wherein the sequentially processing step and the processing progress display step are executed separately but in parallel with one another.

49. An information processing method for sequentially processing a plurality of data files stored in a storage device, said method comprising:
   sequentially processing the plurality of data files; and
   a processing progress display step, comprising:
   a first acquisition step of acquiring a capacity of use of the storage device;
   a second acquisition step of acquiring an amount of data whose processing has been completed; and
   a display step of calculating a degree of progress based on a comparison between the capacity of use acquired in said first acquisition step and the amount of data acquired in said second acquisition step, and displaying the processing progress with the display being continuously updated at asynchronous intervals during processing of the data file,
   wherein the transferring step and the transfer progress display step are executed separately but in parallel with one another.

* * * * *

UNITED STATES PATENT AND TRADEMARK OFFICE
CERTIFICATE OF CORRECTION

PATENT NO.       : 7,158,266 B2
APPLICATION NO.  : 09/841066
DATED            : January 2, 2007
INVENTOR(S)      : Kameyama It is certified that error appears in the above-identified patent and that said Letters Patent is hereby corrected as shown below:

COLUMN 7:
Line 4, "may", should read -- may be --; and
Line 10, "asked to" should read -- asked for --.

COLUMN 9:
Line 24, "a most" should read -- the maximum --;
Line 55, "be" should read -- may be --; and
Line 66, "case" should read -- a case --.

COLUMN 10:
Line 54, "requested to" should read -- requested by --; and
Line 57, "such" should read -- or such --.

COLUMN 12:
Line 58, "with." should read -- with it. --.

Signed and Sealed this

Eighteenth Day of March, 2008

JON W. DUDAS
*Director of the United States Patent and Trademark Office*